United States Patent [19]

Burkhart

[11] 4,265,964

[45] May 5, 1981

[54] LIGHTWEIGHT FROTHED GYPSUM STRUCTURAL UNITS

[75] Inventor: Gerald W. Burkhart, Monaca, Pa.

[73] Assignee: Arco Polymers, Inc., Philadelphia, Pa.

[21] Appl. No.: 106,965

[22] Filed: Dec. 26, 1979

[51] Int. Cl.³ .................. B32B 13/00; B32B 31/00
[52] U.S. Cl. .................. 428/306; 423/171; 423/555; 428/310; 428/320; 428/322; 428/411; 428/703; 521/56; 521/83
[58] Field of Search ............... 428/306, 310, 320, 322, 428/538, 411; 423/171, 555

[56] References Cited

U.S. PATENT DOCUMENTS

| | | | |
|---|---|---|---|
| 2,965,528 | 12/1960 | Loechl | 428/310 |
| 3,516,882 | 6/1970 | Cummisford | 428/306 |

*Primary Examiner*—Marion McCamish
*Attorney, Agent, or Firm*—Lewis J. Young

[57] ABSTRACT

Compositions useful for lightweight structural units such as wallboard panels and the like are provided in which low density expandable thermoplastic granules or particles that have been expanded are used in conjunction with a cementitious base material, such as, gypsum (generally calcined to hemihydrate form, i.e. $CaSO_4 \cdot \frac{1}{2} H_2O$); a surfactant; an additive which acts as a frothing agent to incorporate an appropriate amount of air into the mixture to aid in obtaining a light density without decreasing strength or causing undue brittleness of the finished product; a film forming component to provide better flow and consistence of the mixture, as well as greater strength, flexibility, water resistance and adherence of the final product when the mixture is cured; and a starch which may be added as a binding agent and to increase the adhesive properties of the mixture.

The appropriate combination of the above ingredients can provide a mixture which can be readily mixed, have the proper consistency to be disposed in a board or panel configuration for curing, and will require a decreased excess of water over that required for hydration. Thus, the energy, time, equipment and space necessary to effect curing may be reduced. This will result in significant savings, especially in high speed, high production of product.

14 Claims, No Drawings

LIGHTWEIGHT FROTHED GYPSUM STRUCTURAL UNITS

BACKGROUND OF THE INVENTION

The patent and technical literature disclose that there have been many attempts to incorporate lightweight particles into a cementitious mix to provide lightness without sacrificing an undue amount of strength, and to produce a satisfactory commercial structural product. The obvious advantages of lightweight structural units are to reduce freight and shipping costs and to facilitate handling of the structural units. At the same time, such units must be of sufficient strength to withstand a certain amount of rough handling during the manufacturing process, as well as in loading, unloading and storage of final product, and while they are being assembled into their structural use. Cementitious materials and especially calcined gypsum when cured in relatively thin strata or sheets have a decided brittleness.

Lighter weight structural units can be made in larger sizes, if desired, which can also reduce manufacturing costs per unit of area.

Experience has taught that entrainment of air alone will not product a sufficiently light wallboard that has adequate strength. Further, the incorporation of lightweight particles, alone, even at a low density, does not produce a satisfactory lightweight product.

Problems that have been encountered, lie in the area of dispersing the lightweight articles thoroughly throughout the wet cement or calcined gypsum mixture, and firmly adhering such particles in the cured cementitious matrix. Originally, technologies for decreasing the weight of structural units involved the use of expanded vermiculite, perlite and the like. In more recent times, the lightweight particles used have been particles or beads of expandable thermoplastic polymeric resins, primarily expandable polystyrene beads, as well as polyethylene and various polymeric copolymers, which are generally expanded before use to achieve the lowest density. These thermoplastic particles or beads are advantageous in that each particle or bead comprises closed cells and when they are pre-expanded may be readily made to as low a density as 1 pound per cubic foot or even as low as about 0.5 or 0.6 pounds/cubic foot. Generally, preexpansion on a commercial basis will provide particles from as low as about 0.6 pounds per cubic foot to about 1½ pounds per cubic foot without extra and costly equipment and additional processing. Thus, the thermoplastic lightweight particles are a great deal more advantageous than those priorly used of vermiculite and/or perlite which have a density at least several times that of the thermoplastic granules.

Brittleness of the cementitious material also results in a less desirable product, especially when lightweight products containing low density thermoplastic granules or particles. In a lightweight wallboard, the volume occupied by the thermoplastic and/or entrained air materially reduces the amount of gypsum matrix present and lowers strength and especially the desired flexural strength.

Another major problem that has been encountered in the high speed commercial production of lightweight structural units has been the removal of excess water from the slurry or mixture during the curing. A certain amount of water is required for the water or hydration to react with the dry cementitious material such as calcined gypsum or cement. To obtain a free flowing mixture it has been necessary to add excess water on the order of two or three or more times that actually needed for hydration to provide a smooth, free-flowing, low viscosity mixture suitable for use in transporting and placing the mix into a mold or other means where the slurry or mix is dried to form the core for the lightweight structure. The energy, time, equipment and space required for the removal of the excess moisture create a critical obstacle in the low cost manufacture of lightweight, high speed, high volume production of structural units, such as gypsum wallboard and the like.

SUMMARY OF THE INVENTION

When used in making a core for a lightweight structural unit, the present invention provides the combination of (1) a cementitious base material;

(2) lightweight closed cell plastic particles or granules having appreciable compressive strength;

(3) a film forming latex component to provide a smoother mixture and adding strength, integrity and flexibility to the cured product;

(4) a soap acting as a surfactant to homogenize the mixture and give greater dispersion to the plastic particles;

(5) a frothing agent to entrain air during mixing;

(6) a starch to aid in the binding and adhesiveness properties of the mixture; and (7) water, all of which interact to result in a mixture having desirable flow, consistency, integrity and adhesiveness. When cured the core and resulting wallboard units exhibit compressive strength, flexural strength and nail pull resistance all appropriate for a wallboard, but at the same time, having a weight of only about 60% of the lightest commercial gypsum wallboard.

In its preferred form the present invention may result in a desirable liquid mixture having a decreased water content. Thus in the high volume, high speed production of wallboard, a lower excess of water over that required for hydration of the cementitious material is present and can be volatilized or driven off while materially reducing the energy input, time, space and equipment required, with consequent significant cost reduction of the product.

DETAILED DESCRIPTION OF THE INVENTION

The present invention relates to lightweight structural units such as gypsum wallboard and the like. These units comprise a core of cementitious material, incorporating and enclosing lightweight thermoplastic granules, covered at least on both of its major surfaces by cover or face papers which are adhered to the cured cementitious core. While the product to be made will be described as a gypsum wallboard in which the base cementitious material is some form of gypsum composition or combinations of gypsum compositions, it will be understood that for different applications, other forms of cementitious material such as plaster of Paris, stucco, cements of all kinds may be used to make other products and fall within the scope of the present invention.

For purposes of clarity and definition, the mineral gypsum as found in nature is primarily calcium sulfate dihydrate ($CaSO_4 \cdot 2H_2O$). To make gypsum wallboard, the mineral is ground and calcined so that it is primarily the hemihydrate of calcium sulfate ($CaSO_4 \cdot \frac{1}{2}H_2O$) and denoted as hemihydrate, stucco or calcined gypsum. If dehydration is complete, calcium sulfate ($CaSO_4$) or anhydrite is obtained.

A preferred embodiment of the present invention for making a lightweight core for a structural unit includes the following combinations of materials:

(1) a base cementitious material, preferably calcined gypsum, (2) granules of an expandable thermoplastic material, preferably polystyrene beads, (3) a surfactant, (4) a frothing agent especially suitable for use with latex, and it has been found that these may be combined as a single ingredient, (5) a film forming component such as a latex, preferably a styrene butadiene latex, (6) a starch composition, and (7) water, plus other additives as may be desired.

The preferred manner of making the slurry or mixture involves adding to a suitable vessel a part of the water, one or more surfactants, and a frothing agent which under agitation forms a froth. After allowing for appropriate air to be entrained, the latex and starch may be added. During continued agitation, the gypsum is added slowly to prevent lumping or clumping, and then the balance of the predetermined amount of water is added. To this may be added the expanded thermoplastic particles and stirring or agitation continued to obtain a smooth homogeneous mixture. When it serves an advantageous purpose, the order of addition may be varied.

Caution must be used in the mixing or whipping of air into the mixture. It is preferable to use milder agitation for an appropriately short time. In this way, it has been found that the entrained air is present in dispersed form; too much agitation causes the air bubbles to migrate together and cause large voids.

The cementitious material is a main ingredient of the preferred form of slurry or mixture, since it forms the matrix of the product. Generally calcined gypsum or hemihydrate is the most desirable cementitious compound, but it may be desired to modify it. For quicker setting, compatible additives, such as, anhydrite or other accelerators may be used. When cured the gypsum provides a core material or matrix which in conjunction with the generally paper cover skins provides adequate compressive and flexural strength, but used alone has a relatively high density. Gypsum is also of course well known for its fire retardant ability, and in fact is used in fire barriers in building applications.

The granules of expandable thermoplastic polymers are the main ingredient for providing light density. A preferred form of the invention uses expandable polystyrene beads which have been expanded to a light density, such as, for example, between about 0.5 pounds per cubic foot and about 3 pounds per cubic foot. It is highly desirable that the beads be as fully expanded as reasonably possible (for example, 99% expanded) so that as the mixture is heated to cure it no further expansion of the beads occurs.

The size of the expanded beads or particles may vary. Generally, the expanded beads may run in size from as small as 1/64 inch or less in diameter to about ¼ inch. In the case of wallboard which is generally made in thicknesses of ¼ inch, ⅜ inch, ½ inch and ⅝ inch, small beads are more desirable. When smaller beads are used, they are more fully enclosed or surrounded by the gypsum matrix, and accordingly, more firmly held into the structure or more integral. Expandable polystyrene beads sold commercially for molding cups and containers come in diameters ranging from about 0.012 inch to 0.028 inch prior to being expanded. These may be graded into even narrower size ranges. When expanded, the beads may have a diameter from about 0.04 or 0.05 inch to as large as about 0.10 or 0.12 inch at a density of 0.5 pounds per cubic foot. Beads of the same original size but of a higher density do not expand to as large diameters.

In some instances, it may be desirable to pretreat the expandable polystyrene beads. For example, they may be washed in a suitable liquid to remove grease and other foreign substances. It has been found that the use of an anionic wash renders the surface of the beads more compatible to firm adherence with the gypsum matrix. Further, the beads may, if desired, be etched to roughen their outer surface or be coated or otherwise treated to provide a surface or shape capable of greater adherence to the cured core. For example, expandable polystyrene beads may expand unevenly in a non-spherical shape (sometimes called pruning).

The use of one or more surfactants in the mixture is considered important, because it will provide a better dispersion of the mixture and render it more uniform plus assisting in wetting the surfaces of the thermoplastic granules with the mixture to insure better adhesion to the cementitious material. At the same time, it is desirable to be able to use a surfactant composition which includes or acts as a frothing agent, and especially a latex frothing agent. A preferred compound of this type is one which comprises a solution of magnesium di(lauryl sulfate), or sodium lauryl sulfate, sold under the trademark Sipon-LM. Another combination surfactant and latex frothing composition is shown in U.S. Pat. Nos. 4,102,808 and 4,049,587.

The purpose of the frothing agent is to permit the entrainment of an appropriate amount of air to form a stable, enduring froth, and it is important that the frothing be provided on a controlled basis to avoid air cavities in the final product. In the final slurry or mixture, the frothing incorporates air bubbles into the slurry which result in small air voids in the cured product. If too much frothing is performed, the number of air bubbles is such that they tend to migrate together and can form large empty pockets or air voids rather than a number of small pockets or voids. In the making of a normal gypsum slurry, the density of the final product can be reduced to about forty pounds per cubic foot by the use of air entrainment without the use of any preexpanded polymeric beads. Attempts to reduce the density any further by air entrapment have failed because of the excess number of voids so that a suitable core cannot be obtained.

The use of a film forming component, such as a latex, is a highly desirable addition to the present invention. It is further desirable that the latex be a rubbery type latex polymer so that in the cured compound a polymer film is more flexible and not as brittle. For example, in a styrene butadiene latex which is a preferred additive, the use of significant amounts of butadiene are advantageous in promoting the flexibility property. Styrene butadiene latexes having a styrene to butadiene ratio of about 20/80 to about 80/20 are preferred; however, other well-known rubbery type latexes may be employed as well as mixtures of various latexes.

The presence of a polymer is advantageous in the final product because in combination with a cementitious material it has the property of adding strength as well as flexibility. In the final product, this shows up as an increase in compressive strength as well as flexural strength.

In the wet mixture, the latex adds flowability, good consistency and adhesive properties, increasing the integrity of the mixture.

The use of the starch is also an advantageous additive. The starch acts as a binding agent, gives added adhesion to the mixture and contributes to the integrity of the mix.

Thus, in the present invention both the starch and the latex add to the enhancement of a gypsum compound as a binder for the light thermoplastic granules and assist in providing a highly flowable mix, which as will be seen later, can be made using a decreased water content.

In the cementitious mixture embodying the present invention, the various ingredients are used preferably within the following ranges:

(a) The thermoplastic granules or beads, having a density of about 0.5 to 1.0 pounds per cubic feet—from about 0 to up to about 3% by weight of the gypsum with a preferred content of about 2.8%. It becomes difficult to incorporate into the gypsum more than about 3% by weight of granules and, of course, if the lightest practical product is desired the amount of the thermoplastic granules should be near the top of the range.

(b) Latex—from about 0.1 to about 5.0 percent by weight of gypsum and preferably about 2.0%.

(c) The surfactant and frothing agent when used as a single combined additive—0.075% to about 0.3% by weight of gypsum, preferably about 0.1 to 0.2% when magnesium lauryl sulfate is used.

(d) Starch—from about 0.5 to about 3.0% by weight of gypsum, and preferably about 2%.

(e) The gypsum will be the balance of the dry ingredients or about 91 to about 99 parts by weight.

(f) The total water content is preferably maintained as low as practicable, on the order of about 50 to 60% by weight of hemihydrate, keeping in mind that it is preferable to use only as much excess of water over that required to react with the cementitious compound as is necessary to provide the desired homogenous flowable mixture which may by readily placed into a mold or other means for making lightweight cementitious cores for wallboard.

According to the present invention, the preferred ingredients for an appropriate mixture or slurry for making cores for lightweight wallboard are those described herein. However, it is not the intent to exclude other additives that may be desirable to add for obtaining other properties in the mixture or final product.

To exemplify the present invention, a series of sample compositions A through E, with the ingredients given in parts by weight, were prepared as shown in the upper portion of Table I, and the viscosities of the samples were determined for comparison purposes. It will be noted that sample A consists only of 1,000 parts by weight of gypsum and 1,600 parts by weight of water and is shown as a control example.

In the bottom half of Table I the Brookfield viscosity of Samples A through E is shown in centipoises measured at about ambient temperature or 25° C., operating the Brookfield viscosity measuring equipment at 20 revolutions per minute.

TABLE I

| Sample | A | B | C | D | E |
|---|---|---|---|---|---|
| Gypsum in parts by weight | 1000 | 1000 | 1000 | 1000 | 1000 |
| $H_2O$ in parts by weight | 1600 | 1600 | 1600 | 1600 | 1600 |
| Styrene/Butadiene Latex in parts by weight | — | 5* | — | 5* | 5** |
| Starch in parts by weight | — | — | 20 | 20 | — |
| Surfactant and frothing agent in parts by weight | — | — | — | — | 1 |

| Brookfield Viscosity (cps) at about 25° C. | A | B | C | D | E |
|---|---|---|---|---|---|
| After 3 minutes | 800 | 800 | 500 | 2500 | 150 |
| After 12 minutes | 2300 | set | 1000 | 4000 | 1100 |
| After 30 minutes | set | — | — | — | set in 20 mins. |

*The latex in these samples was a styrene-butadiene latex having a styrene to butadiene ratio of about 55:45.
**The latex in this sample was a styrene-butadiene latex having a styrene to butadiene ratio of about 66:34 with about 1% of a non-ionic surfactant.

Looking at Table I, the Brookfield results indicate that while the use of latex, which normally provides an increase in viscosity at least temporarily after mixing with a cementitious compound, does not show an initial increased viscosity. It does apparently provide a quick rise in viscosity and set after 12 minutes (Sample B). The addition of starch appears to give a decrease in viscosity at the initial stages and then a more gradual rise (Sample C). When starch and latex are used (Sample D), the initial viscosity is several times higher than that of the control sample and increases significantly after 12 minutes. When the latex and surfactant are used in the mixture (see Sample E) there is a markedly lower viscosity after 3 minutes, but a relatively quick rise to 1100 after 12 minutes and the mixture is set in 20 minutes.

It is believed that from the foregoing examples it may be seen that the additives and combinations thereof may be used in a manner to provide a low viscosity mixture, and accordingly, the use of decreased water in making the mixture will provide an appropriate mixture suitable for the making of cores. In addition it seems that by varying the combinations and quantities of the various additives, some control of the setting point for the cementitious composition can be achieved. The specific formulation and the polymerization techniques of the latex, including additives used therein may also have an influence on the control of the setting time of the complete mixture, either to hasten or retard the same.

Roughly, approximately 18% by weight of the hemihydrate gypsum is the amount of water required for the hydration reaction to cause the gypsum to cure. Any excess of water over this amount which may be necessary to provide an appropriate mixture capable of being transported and disposed in the mold or other means for curing requires the energy, time, space and equipment to cause it to be evaporated or volatilized and expelled from the mixture. Accordingly, the present invention has as its intention the achievement of providing a mixture or slurry requiring as little water as possible in excess of that required for proper hydration.

Obviously, considering the total amount of water required it must be remembered that the additives themselves may provide some water. For example, although both the surfactant and the latex are used in relatively minor proportions, the surfactant described above is used as an aqueous solution and in the case of the latex, it is normal that the latex will be 50% solids and thus approximately half of the latex content added is also water. While the amount of water incorporated by these additives in the slurry may be minor, in high speed production type manufacture of lightweight wallboard cores, it is highly desirable that as little water as possible be used. The use of expanded high volume, low weight thermoplastic particles to near the maximum possible is beneficial, not only in lightening the weight of the structure but in reducing the amount of gypsum and further reducing the water requirement.

I claim:

1. In a lightweight structural unit, the improvement which comprises a heat-cured frothed core containing:
   (a) a gypsum composition acting as a matrix,
   (b) a rubbery polymeric latex, in an amount of from about 0.1 to 5% by weight of gypsum,
   (c) expandable thermoplastic granules in expanded form, in an amount up to about 3% by weight of gypsum,
   (d) a surfactant,
   (e) a latex frothing agent, said surfactant and said frothing agent being present in a total amount of from about 0.075 to about 0.3% by weight of gypsum,
   (f) starch, in an amount of from about 0.5 to 3% by weight of gypsum, and
   (g) water, but only in an amount sufficient to react with said gypsum composition plus sufficient excess to provide a flowable mixture capable of being disposed in form for curing as a structural element.

2. A lightweight structural unit as claimed in claim 1 wherein the surfactant and the frothing agent comprise a single compound.

3. A lightweight structural unit as claimed in claim 1 wherein the latex is a styrene-butadiene copolymer.

4. A heat-cured frothed core composition suitable for a lightweight wallboard which comprises:
   (a) calcined gypsum in an amount of from about 89 to about 99 parts by weight,
   (b) up to about 3% by weight of said gypsum of expandable thermoplastic granules in expanded condition,
   (c) from about 0.1% to about 5% by weight of said gypsum of an emulsion polymeric latex,
   (d) a surfactant,
   (e) a latex frothing agent, said agent and said surfactant being present in a total amount of from about 0.075% to about 0.3% by weight of said gypsum,
   (f) from about 0.5% to about 3% by weight of said gypsum of starch, and
   (g) water in an amount sufficient to react with said gypsum plus an excess amount only sufficient to provide a smooth plastic flowable mixture to enable disposition of said mixture in a mold means to form said core.

5. In a lightweight gypsum wallboard having a core and at least two facing skin members adhered thereto, an improved core which has been frothed and heat-cured and which comprises:
   (a) a hemihydrate gypsum composition,
   (b) up to about 3% by weight of said gypsum composition of expandable thermoplastic particles which have been expanded to a density below about 3 pounds per cubic foot,
   (c) from about 0.1% to about 5.0% by weight of said gypsum composition of a rubbery polymeric latex,
   (d) a surfactant,
   (e) a latex frothing agent, and
   (f) water in an amount sufficient for hydration of said gypsum composition plus a minimum excess of water sufficient permit mixing of said ingredients into a flowable mixture and disposing said mixture in a mold means to form said core.

6. The product claimed in claim 5 wherein the surfactant is a non-ionic surfactant.

7. The product claimed in claim 5 wherein the surfactant and the frothing agent comprise sodium lauryl sulfate.

8. The product claimed in claim 5 wherein the rubbery polymeric latex comprises a styrene-butadiene latex having a styrene to butadiene ratio of between about 20:80 to about 80:20.

9. The product as claimed in claim 5 in which the expanded thermoplastic particles are present in an amount of about 2.8% by weight of gypsum, the latex is present in an amount of about 2% by weight of the gypsum, and the surfactant and frothing agent are present in a total amount of about 0.1 to 0.2% by weight of the gypsum.

10. The process of making a core for a lightweight structural unit which comprises mixing together a gypsum composition, a rubbery polymeric latex in an amount of about 0.1 to 5% by weight of the gypsum, expandable thermoplastic granules in expanded form in an amount of up to about 3% by weight of the gypsum, a surfactant, a frothing agent, said surfactant and frothing agent being present in a total amount of from about 0.075 to about 0.3% by weight of the gypsum, and water, said water being added only in an amount to react with said gypsum composition plus sufficient excess to provide a flowable mixture, mixing said ingredients to entrain air and form a froth, disposing the same in a form means, and heating said mixture to cured form.

11. The process as claimed in claim 10 in which the surfactant, frothing agent and a portion of the water are initially mixed and agitated to make a froth prior to the addition of the balance of the ingredients.

12. The process claimed in claim 10 in which the surfactant comprises a non-ionic surfactant.

13. The process of making a lightweight gypsum composition wallboard having a core and two facing members adhered thereto, the improvement in the making of a core which comprises:
   (a) mixing water, latex in an amount of from about 0.1 to 5% by weight of the gypsum, a surfactant, and a latex frothing agent, said surfactant and frothing agent being used in a total amount of from about 0.075 to 0.3% by weight of gypsum,
   (b) agitating the same to entrain air and form a froth,
   (c) adding calcined gypsum and partially expanded thermoplastic particles at a density of less than 3 pounds per cubic foot in a finite amount of up to 3% by weight of gypsum in a controlled manner to obtain a smooth flowable mixture.
   (d) adding the balance of a predetermined amount of the water, whereby said mixture contains a minimum of water in excess of that required for reaction with said gypsum and only sufficient to obtain a usable flowable mixture required to be able to place said mixture in a means for molding said core.

14. The process as claimed in claim 13 in which the latex is added in an amount of about 2% by weight of the gypsum, the surfactant and frothing agent are added in a total amount of about 0.1 to 0.2% by weight of the gypsum and the thermoplastic particles are added in an amount of about 2.8% by weight of the gypsum.

* * * * *